July 25, 1944.   J. E. CHAPMAN   2,354,364
OIL COOLING DEVICE
Filed Jan. 4, 1943

Inventor:
JAMES E. CHAPMAN,
By
Attorney.

Patented July 25, 1944

2,354,364

UNITED STATES PATENT OFFICE 2,354,364

OIL COOLING DEVICE

James E. Chapman, Los Angeles, Calif., assignor to The Garrett Corporation, Airesearch Manufacturing Company division, Los Angeles, Calif., a corporation of California Application January 4, 1943, Serial No. 471,247

8 Claims. (Cl. 236—35)

My invention relates to controls for oil coolers and relates in particular to a control having especial utility with oil coolers which are used with aircraft engines to cool the crank case oil.

It is an object of the invention to provide a control means which will adjust an air valve, such as a flap or shutter in accordance with the heat absorbing requirements of the cooler, and a further object of the invention is to provide a device of this character suitable for use under conditions wherein the air valve is spaced at some distance from the oil cooler and the part of the control device which is in direct association with the cooler.

A further object of the invention is to provide a device having a thermostat exposed to oil which has been cooled within the cooler, a control part moved through consecutive positions by the thermostat in accordance with changes in the temperature to which the thermostat is subjected and power means, including a motor for moving the valve means through consecutive positions in accordance with the movement of the control part.

It is a further object of the invention to provide an oil cooler control having a part which is moved in accordance with changes in temperature of oil which has been cooled in the cooler, or oil which has passed through or into a designated portion of the cooler, a second part which is moved in accordance with different positions of the closure element of the valve means, for example, in accordance with different positions of the shutter which controls the flow of air to the cooler, and means for moving the closure element of the valve means in consequence of and in accordance with the changes in relative positions of the first and second parts, whereby the closure means will be adjusted in accordance with the heat absorbing requirements of the cooler.

A further object of the invention is to provide a device such as described in the foregoing parts of this specification, having control means responsive to pressure conditions within the oil cooler to accomplish movement of the closure of the air valve, which means may be arranged so as to override the normal temperature responsive control of the device.

Further objects and advantages of the invention will be brought out in the following part of the specification.

Referring to the drawing which is for illustrative purposes only.

Figure 1:
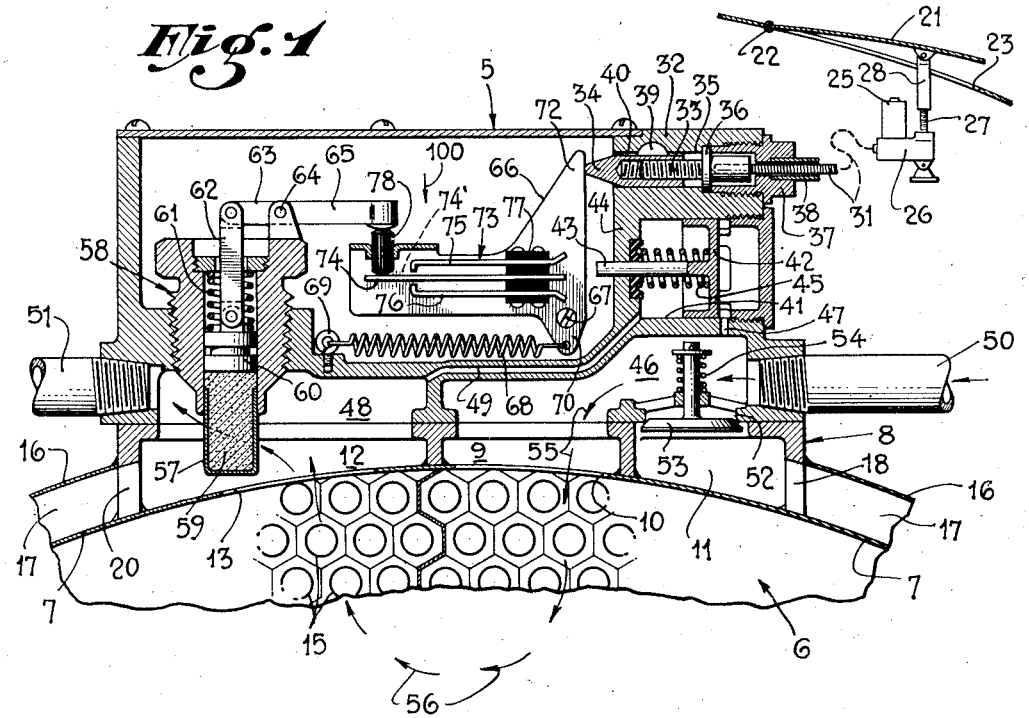
Fig. 1 is a sectional view of diagrammatic character, showing a preferred form of my invention.

In Fig. 1 I show the control device 5 mounted on the upper part of an oil cooler 6. I have shown only the upper portion of the oil cooler 6 for the reason that it may be of any known construction having a passage for the oil to be cooled and tubes extending within or through this passage for conducting a cooling medium in heat exchange relation to the oil. The oil cooler 6, the upper portion of which is shown in Fig. 1, has a shell 7 to which an attachment fitting 8 is secured. This attachment fitting provides an oil inlet chamber 9 which communicates through an inlet port 10 in the shell 7 with the interior of the shell, a bypass chamber 11 and an outlet chamber 12 which communicates through a port 13 with another portion of the interior of the shell 7. The interior of the cooler shell is divided into passages or oil flow spaces by baffles, one of which is shown at 14, and air tubes 15 are extended through the interior of the shell 7 so as to lie in heat exchange relation to the flow of oil through the passages therein. An outer wall 16 is extended entirely around the exterior of the shell 7 from one side of the fitting 8 to the other, thereby providing a warm-up passage or space 17 which communicates through a port 18 with the bypass chamber 11 and through the port 20 with the outlet chamber 12.

Figure 2:
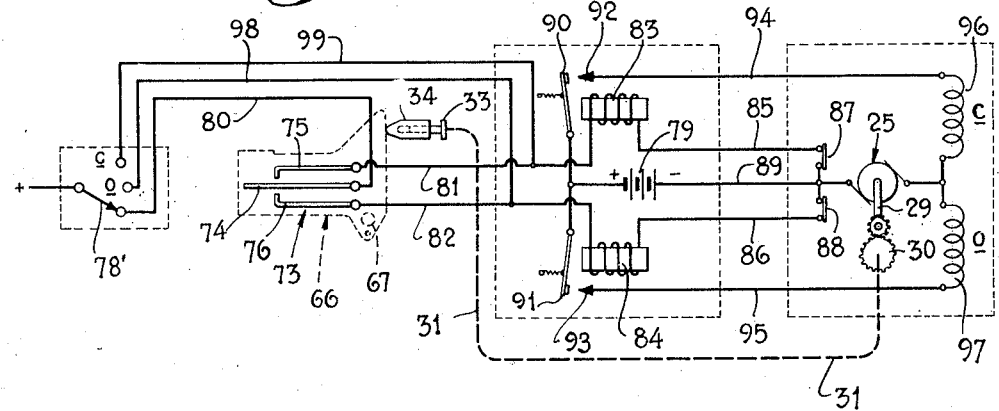
Fig. 2 is an electrical diagram of the invention.

As schematically shown in Fig. 1, there is a valve for controlling the flow of air through the tubes 15 of the cooler, such valve comprising a flap or door 21, hinged at 22 so that it may be swung between closed and open positions relative to an opening 23 in the wall structure of the aircraft, this opening 23 being disposed in such relation to the cooler 6 that when the flap 21 is in open relation thereto, air will pass through the cooler, the position of the flap 21 controlling the volume of the air which passes through the cooler. The flap is moved by a motivating means or jack 24 which may be of the type shown in the copending application of George H. Gill, Serial No. 431,967, filed February 23, 1942, for Flap operating means. It comprises a motor 25 which, through a reduction gear 26, drives a screw 27 having threaded engagement with a sleeve 28 which is connected to the flap 21. As shown in Fig. 2, the motor 25 is of the split winding reversible type, and, as further shown in Fig. 2, the motor 25 drives a shaft 29 which in turn, through gears 30, drives a flexible shaft 31. This flexible shaft 31 extends to the shell 32 of the control device 5 and is connected to a cam shown as a screw 33 having threaded engagement with an internally threaded plunger 34 which moves back and forth in accordance with the forward and reverse rotation of the motor 25, and therefore in accordance with the opening and closing movement of the flap 21.

The screw 33 is rotatable in an opening 35 in the shell 32 and has thereon a flange 36 which prevents or limits axial movement of the screw. The screw 33 is held in operative position in the opening 35 by a plug 37 having a recess in the outer end thereof to receive the end of the sheath 38 by which the flexible shaft 31 is covered. The leftward end of the opening 35 contains the plunger 34 and a key 39 is disposed in the opening 35 in a position to engage a keyway 40 in the plunger 34, thereby preventing rotation of the plunger 34, but permitting axial movement thereof.

Below the opening 35, the shell 32 is bored to provide a cylinder 41 in which a piston 42 is slidable, this piston having a stem 43 which extends through an opening in the inner end wall 44 of the cylinder 41. The piston 42 is urged in rightward direction by a spring 45. The shell 32 has an inlet chamber 46 which communicates with the chamber 9, and which, through a small port 47, communicates with the rightward end of the cylinder 42. The shell 32 has an outlet chamber 48 which is in open communication with the outlet chamber 12 of the cooler and which communicates through a passage 49 with the leftward end of the cylinder 41. Piping 50 is connected so as to deliver hot oil to be cooled into the inlet chamber 46, and piping 51 is provided in communication with the outlet chamber 48 to carry off oil which has been cooled. The casing 32 has a bypass port 52 to connect the inlet chamber 46 with the bypass chamber 11 of a fitting 8, this port 52 being normally closed by a bypass valve 53 urged upward into closed position by a spring 54. In the normal operation of the cooler, the hot oil flows from the chamber 46 through the inlet chamber 9 and the inlet port 10 of the cooler shell 7, as indicated by arrows 55. The oil to be cooled then passes through the spaces provided therefor in the interior of the shell 7, and, as indicated by arrows 56, finally passes through the outlet port 13 and the chambers 12 and 48 to the return piping 51 of the oil circulating system.

In passing through the chambers 12 and 48, the cooled oil contacts the lower end 57 of a thermostat device 58 which is threaded through the upper wall of the chamber 48. This thermostat 58 has in the lower portion thereof a body 59 of expansible material such as wax having a relatively high coefficient of expansion. A movable wall such as a piston 60 engages the upper face of the expansible body 59 and is forced yieldably downward by means of a spring 61. A substantially vertical link 62 connects the piston 60 with the leftward end of a lever 63 which is supported by pivot means 64. The rightward portion 65 of the lever 63 is referred to as a part which moves forward and rearward in accordance with the change in the temperature of the oil which engages the lower end 57 of the thermostat 58.

The unit shown in Fig. 1 has a second movable part 66 arranged in cooperative relation to the part 65. This movable part 66 is swingably supported on a pivot screw 67 disposed in its lower right hand corner, and a spring 68 acting in tension between a connection 69 and the lower end 70 of the member 66 urges the part upward from the position in which it is shown in Fig. 1, but the upward movement of the part 66 is limited by engagement of its upper rightward extremity 72 with the projecting end of the plunger 34. A control switch 73 is mounted in cooperative relation to the movable parts 65 and 66. As shown in Fig. 1, it is preferably mounted on the control part 66 and comprises a central contact spring 74 and upper and lower contacts 75 and 76 arranged in spaced relation to the central contact 74. These contacts 74, 75, and 76 are mounted on the movable part 66 by means of blocks 77 of insulating material. When the leftward or outer end of the contact 74 is unrestrained it will, due to the spring therein, move into engagement with the upper contact 75, as shown by dotted lines 74', but when the movable parts 65 and 66 are in neutral cooperative relation, as shown in Fig. 1, a body 78 of insulating material, disposed between the member 65 and the contact 74, will hold this contact 74 in centralized relation to the contacts 75 and 76, or, in other words, in neutral position.

The manner in which the control switch 73 controls the operation of the motor 25 may be explained with relation to Fig. 2. A manual switch contact 78' is connected to the positive side of a power source, which may be the battery 79. This manual switch contact is shown connected through a conductor 80 with the contact 74. The contacts 75 and 76 are respectively connected through conductors 81 and 82 with the front terminals of relays 83 and 84. The rear terminals of these relays 83 and 84 are connected through conductors 85 and 86 and limit switches 87 and 88 with a conductor 89 which is carried back to the negative side of the power source 79. The relays 83 and 84 have motor control contacts 90 and 91 which are connected to the positive pole of the power source 79 and stationary contacts 92 and 93 connected respectively through conductors 94 and 95 with the motor windings 96 and 97. When the contact 74 engages the contacts 75, the relay 83 will be energized and the circuit through the motor winding 96 will be closed so that the motor 25 will be operated to close the shutter 21, and when the contact 74 engages the contact 76, the relay 84 will be energized so as to close the circuit which includes the motor winding 97, thereby operating the motor 25 so as to open the shutter 21. Automatic control of the shutter through the switch 83 may be replaced by manual control. By movement of the manual contact 78', into engagement with the contact o, current may be fed through a conductor 98 and a portion of the conductor 82 so as to energize the relay 84 which will cause operation of the motor 25 in a direction to open the shutter 21. Similarly, a movement of the manual contact 78' into engagement with the contact c will result in a flow of current through a conductor 99 and a portion of the conductor 81 to energize the relay 83 so that the motor 25 will be then operated to close the shutter 21.

In Fig. 1 the cooperating parts are shown in positions which they assume during normal operation of the cooler. That is to say, the shutter 21 is in a normal position, for example, half open, and the positions of the movable parts 65 and 66 are such that the switch contact 74 is held in a neutral position between the contacts 75 and 76. Should there be an increase in the temperature of the oil engaging the lower end of the thermostat 58, the movable part 65 will be swung downward or forward as indicated by the arrow 100. This will result in movement of the contact 74 downward into engagement with the contact 76, with the result that the motor 25 will be energized so as to move the shutter 21 toward its open position, and at the same time, rotation of the flexible shaft 31 will cause a left hand rotation of the screw 33 so as to produce a leftward movement of the plunger 34 so as to rotate the part 66 downward or forward. This downward or forward movement of the part 66 will carry the contact 76 downward and out of engagement with the contact 74, deenergizing the motor 25 and stopping the opening movement of the shutter 21. On the other hand, should there be a cooling of the oil which is brought into engagement with the lower portion of the thermostat 58, the movable part 65 will be swung rearward or upward, and the contact 74 will be permitted to swing upward into engagement with the contact 75, to actuate the relay 83 and close the motor circuit through the winding 96, whereupon the motor 25 will be operated in a direction to produce a closing movement of the shutter 21. At the same time, the flexible shaft 31 will rotate the screw 33 in clockwise direction so as to move the plunger 34 rightward and permit the part 66 to move upward or rearward in response to the pull of the spring 68, thus moving the contact 75 upward out of engagement with the contact 74. Should the interior of the cooler 6 drop to such low temperature as to produce a high back pressure in the inlet chamber 46, the pressure differential between the chambers 46 and 48 will be transmitted through the openings 47 and 49 to the opposite faces of the piston 42. The superior pressure against the rightward face of the piston 42 will move the same leftward against the pressure of the spring 45, and the stem 43 will engage the movable part 66 and rotate the same in anticlockwise direction, or, in other words, will impart forward movement to this movable part 66 so that it will be swung downward away from the part 65, permitting the contact 74 to swing upward into engagement with the contact 75, whereby the motor 25 will be energized so as to move the shutter 21 in a position to close the opening 23, thereby completely cutting off the flow of air through the core of the cooler 6 for the purpose of producing an immediate warming up of the interior of the cooler so as to reestablish a flow of hot oil therethrough. As soon as the flow through the cooler is restablished, the pressure differential acting upon the piston 42 will be reduced, permitting the piston 42 to move rightward out of engagement with the movable part 66, whereupon such movable part 66 will be swung upward by the spring 68 and the control of the motor 25 will be then taken over by the thermostat 58.

I claim as my invention:

1. In a control for an oil cooler having an oil passage for the flow of oil to be cooled and an adjacent passage for the flow of a cooling medium in heat exchange relation to said flow of oil, and valve means for reducing and increasing the flow of said cooling medium through said adjacent passage, the combination of: a thermostat exposed to changes in the temperature of said flow of oil; a part moved forward in consequence of the warming of said thermostat and rearward in response to the cooling of said thermostat; a second part movably supported in cooperative relation to said first part; means to move said second part forward in consequence of the opening movement of said valve means and rearward in consequence of the closing movement of said valve means; motor means operable by an opening flow of power to produce said opening movement of said valve means and operable by a closing flow of power to produce said closing movement of said valve means; power control means carried by one of said parts and operating in consequence of forward movement of said first part from a neutral position relatively to said second part to produce an opening flow of power to said motor means and to produce a closing flow of power to said motor means in consequence of the rearward movement of said first part from said neutral position relatively to said second part; and means operating in consequence of the building up of an excess oil pressure in said oil passage of said cooler to move said second part forward from said neutral position whereby said power control means will be actuated to produce a closing flow of power to said motor means.

2. In a control for an oil cooler having an oil passage for the flow of oil to be cooled and an adjacent passage for the flow of a cooling medium in heat exchange relation to said flow of oil, and valve means for reducing and increasing the flow of said cooling medium through said adjacent passage, the combination of: a thermostat exposed to changes in the temperature of said flow of oil; a part moved forward in consequence of the warming of said thermostat and rearward in response to the cooling of said thermostat; a second part movably supported in cooperative relation to said first part; means to move said second part forward in consequence of the opening movement of said valve means and rearward in consequence of the closing movement of said valve means; motor means operable by an opening flow of power to produce said opening movement of said valve means and operable by a closing flow of power to produce said closing movement of said valve means; power control means operating in consequence of forward movement of said first part from a neutral position relatively to said second part to produce an opening flow of power to said motor means and to produce a closing flow of power to said motor means in consequence of the rearward movement of said first part from said neutral position relatively to said second part; and means operating in consequence of the building up of an excess oil pressure in said oil passage of said cooler to move said second part forward from said neutral position whereby said power control means will be actuated to produce a closing flow of power to said motor means.

3. In a control for an oil cooler having an oil passage for the flow of oil to be cooled and an adjacent passage for the flow of a cooling medium in heat exchange relation to said flow of oil, and valve means for reducing and increasing the flow of said cooling medium through said adjacent passage, the combination of: a thermostate exposed to changes in the temperature of said flow of oil; a part moved forward in consequence of the warming of said thermostat and rearward in response to the cooling of said thermostat; a second part movably supported in cooperative relation to said first part; means to move said second part forward in consequence of the opening movement of said valve means and rearward in consequence of the closing movement of said valve means; motor means operable by an opening flow of power to produce said opening movement of said valve means and operable by a closing flow of power to produce said closing movement of said valve means; power control means operating in consequence of forward movement of said first part from a neutral position relatively to said second part to produce an opening flow of power to said motor means and to produce a closing flow of power to said motor means in consequence of the rearward movement of said first part from said neutral position relatively to said second part; and means operating in consequence of the building up of an excess oil pressure in said oil passage of said cooler to produce a relative movement of said first and second parts wherein said first part will be rearward of a neutral position relative to said second part whereby said power control means will be actuated to produce a closing flow of power to said motor means.

4. In a control for an oil cooler having an oil passage for the flow of oil to be cooled and an adjacent passage for the flow of a cooling medium in heat exchange relation to said flow of oil, and valve means for reducing and increasing the flow of said cooling medium through said adjacent passage, the combination of: a thermostat exposed to changes in the temperature of said flow of oil; a part moved forward in consequence of the warming of said thermostat and rearward in response to the cooling of said thermostat; a second part movably supported in cooperative relation to said first part; rotation transmitting means connected to said motor means so as to be rotated in one direction as said motor means imparts opening movement to said valve means and in the opposite direction as said motor means imparts closing movement to said valve means; cam means rotated by said rotation transmitting means, said cam means having an element engaging said second part so as to move said second part forward in consequence of the opening movement of said valve means and rearward in consequence of the closing movement of said valve means; motor means operable by an opening flow of power to produce said opening movement of said valve means and operable by a closing flow of power to produce said closing movement of said valve means; power control means carried by one of said parts and operating in consequence of forward movement of said first part from a neutral position relatively to said second part to produce an opening flow of power to said motor means and to produce a closing flow of power to said motor means in consequence of the rearward movement of said first part from said neutral position relatively to said second part; and means operating in consequence of the building up of an excess oil pressure in said oil passage of said cooler to move said second part forward from said neutral position whereby said power control means will be actuated to produce a closing flow of power to said motor means.

5. In a control for an oil cooler having an oil passage for the flow of oil to be cooled and an adjacent passage for the flow of a cooling medium in heat exchange relation to said flow of oil, and valve means for reducing and increasing the flow of said cooling medium through said adjacent passage, the combination of: a thermostat exposed to changes in the temperature of said flow of oil; a part moved forward in consequence of the warming of said thermostat and rearward in response to the cooling of said thermostat; a second part movably supported in cooperative relation to said first part; rotation transmitting means connected to said motor means so as to be rotated in one direction as said motor means imparts opening movement to said valve means and in the opposite direction as said motor means imparts closing movement to said valve means; cam means rotated by said rotation transmitting means, said cam means having an element engaging said second part so as to move said second part forward in consequence of the opening movement of said valve means and rearward in consequence of the closing movement of said valve means; motor means operable by an opening flow of power to produce said opening movement of said valve means and operable by a closing flow of power to produce said closing movement of said valve means; power control means operating in consequence of forward movement of said first part from a neutral position relatively to said second part to produce an opening flow of power to said motor means and to produce a closing flow of power to said motor means in consequence of the rearward movement of said first part from said neutral position relatively to said second part; and means operating in consequence of the building up of an excess oil pressure in said oil passage of said cooler to move said second part forward from said neutral position whereby said power control means will be actuated to produce a closing flow of power to said motor means.

6. In a control for an oil cooler having an oil passage for the flow of oil to be cooled and an adjacent passage for the flow of a cooling medium in heat exchange relation to said flow of oil, and valve means for reducing and increasing the flow of said cooling medium through said adjacent passage, the combination of: a thermostat exposed to changes in the temperature of said flow of oil; a part moved forward in consequence of the warming of said thermostat and rearward in response to the cooling of said thermostat; a second part movably supported in cooperative relation to said first part; rotation transmitting means connected to said motor means so as to be rotated in one direction as said motor means imparts opening movement to said valve means and in the opposite direction as said motor means imparts closing movement in said valve means; cam means rotated by said rotation transmitting means, said cam means having an element engaging said second part so as to move said second part forward in consequence of the opening movement of said valve means and rearward in consequence of the closing movement of said valve means; motor means operable by an opening flow of power to produce said opening movement of said valve means and operable by a closing flow of power to produce said closing movement of said valve means; power control means carried by one of said parts and operating in consequence of forward movement of said first part from a neutral position relatively to said second part to produce an opening flow of power to said motor means and to produce a closing flow of power to said motor means in consequence of the rearward movement of said first part from said neutral position relatively to said second part; an expansible fluid receiving member connected to the inlet portion of said cooler so as to receive oil under pressure therefrom, said expansible member having a wall which is moved in response to an excess pressure in said oil such as occurs when oil congeals within the cooler; and means for transmitting movement from said wall to said second member to move said second member in forward direction from said neutral position.

7. In a control for an oil cooler having an oil passage for the flow of oil to be cooled and an adjacent passage for the flow of a cooling medium in heat exchange relation to said flow of oil, and valve means for reducing and increasing the flow of said cooling medium through said adjacent passage, the combination of: a thermostat exposed to changes in the temperature of said flow of oil; a part moved forward in consequence of the warming of said thermostat and rearward in response to the cooling of said thermostat; a second part movably supported in cooperative relation to said first part; flexible shaft connected to said motor means so as to be rotated in one direction as said motor means imparts opening movement to said valve means and in the opposite direction as said motor means imparts closing movement to said valve means; a screw rotated by said flexible shaft; means to limit axial movement of said screw; a threaded element engaged by said screw so as to be moved back and forth thereby, said element engaging said second part so as to move said second part forward in consequence of the opening movement of said valve means and rearward in consequence of the closing movement of said valve means; motor means operable by an opening flow of power to produce said opening movement of said valve means and operable by a closing flow of power to produce said closing movement of said valve means; power control means operating in consequence of forward movement of said first part from a neutral position relatively to said second part to produce an opening flow of power to said motor means and to produce a closing flow of power to said motor means in consequence of the rearward movement of said first part from said neutral position relatively to said second part; means operating in consequence of the building up of an excess oil pressure in said oil passage of said cooler to move said second part forward from said neutral position whereby said power control means will be actuated to produce a closing flow of power to said motor means; and spring means urging said second part rearward so that it will be held in engagement with said threaded element.

8. In a control for an oil cooler having an oil passage for the flow of oil to be cooled and an adjacent passage for the flow of a cooling medium in heat exchange relation to said flow of oil, and valve means for reducing and increasing the flow of said cooling medium through said adjacent passage, the combination of: a thermostat exposed to changes in the temperature of said flow of oil; a part moved forward in consequence of the warming of said thermostat and rearward in response to the cooling of said thermostat; a second part movably supported in cooperative relation to said first part; a flexible shaft connected to said motor means so as to be rotated in one direction as said motor means imparts opening movement to said valve means and in the opposite direction as said motor means imparts closing movement to said valve means; a screw rotated by said flexible shaft; means to limit axial movement of said screw; a threaded element engaged by said screw so as to be moved back and forth thereby, said element engaging said second part so as to move said second part forward in consequence of the opening movement of said valve means and rearward in consequence of the closing movement of said valve means; motor means operable by an opening flow of power to produce said opening movement of said valve means and operable by a closing flow of power to produce said closing movement of said valve means; power control means carried by one of said parts and operating in consequence of forward movement of said first part from a neutral position relatively to said second part to produce an opening flow of power to said motor means and to produce a closing flow of power to said motor means in consequence of the rearward movement of said first part from said neutral position relatively to said second part; an expansible fluid receiving member connected to the inlet portion of said cooler so as to receive oil under pressure therefrom, said expansible member having a wall which is moved in response to an excess pressure in said oil such as occurs when oil congeals within the cooler; means for transmitting movement from said wall to said second member to move said second member in forward direction from said neutral position; and spring means urging said second part rearward so that it will be held in engagement with said threaded element.

JAMES E. CHAPMAN.